Figure 1:
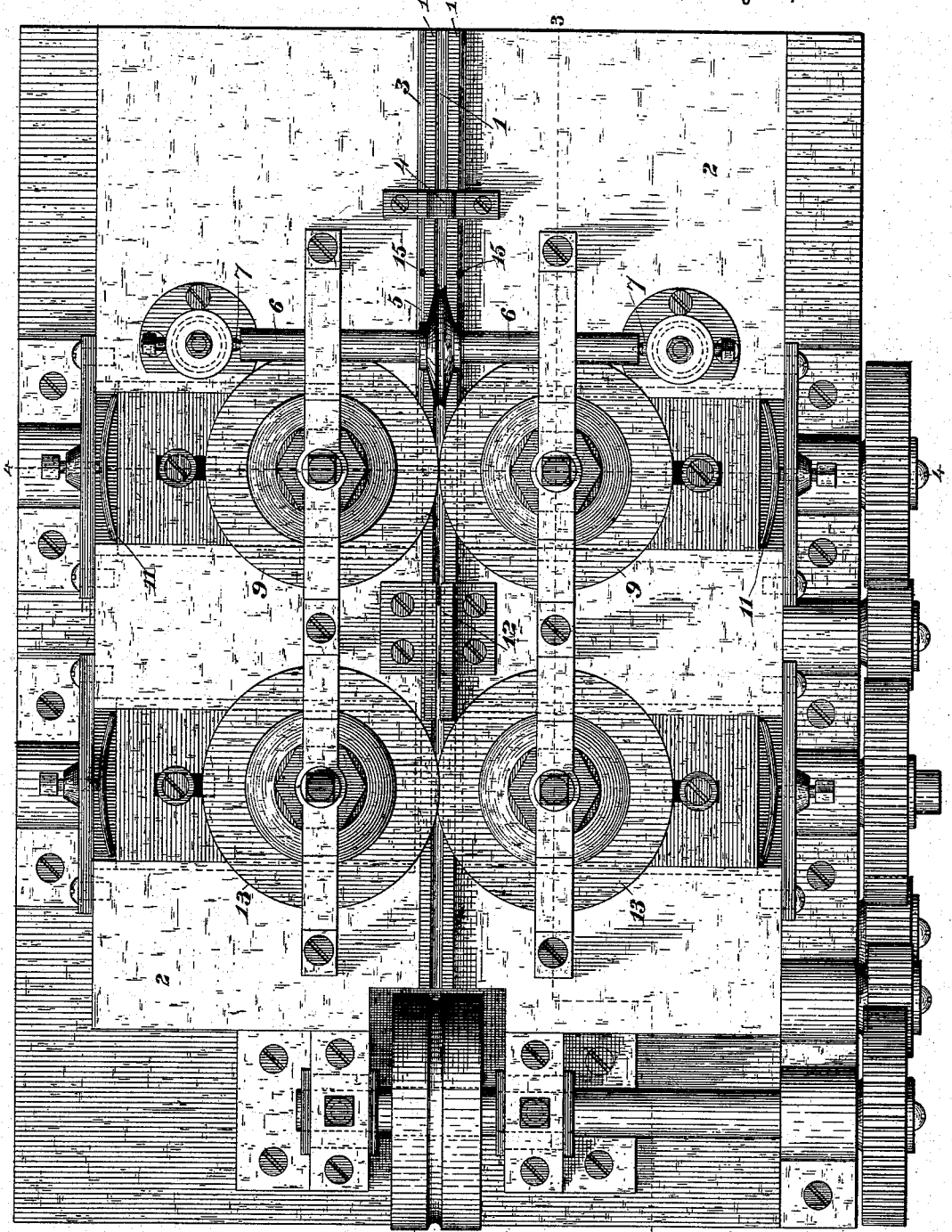

(No Model.)  
J. J. C. SMITH.  
MACHINE FOR COVERING WIRE FOR ELECTRICAL PURPOSES.  
No. 276,724. Patented May 1, 1883.
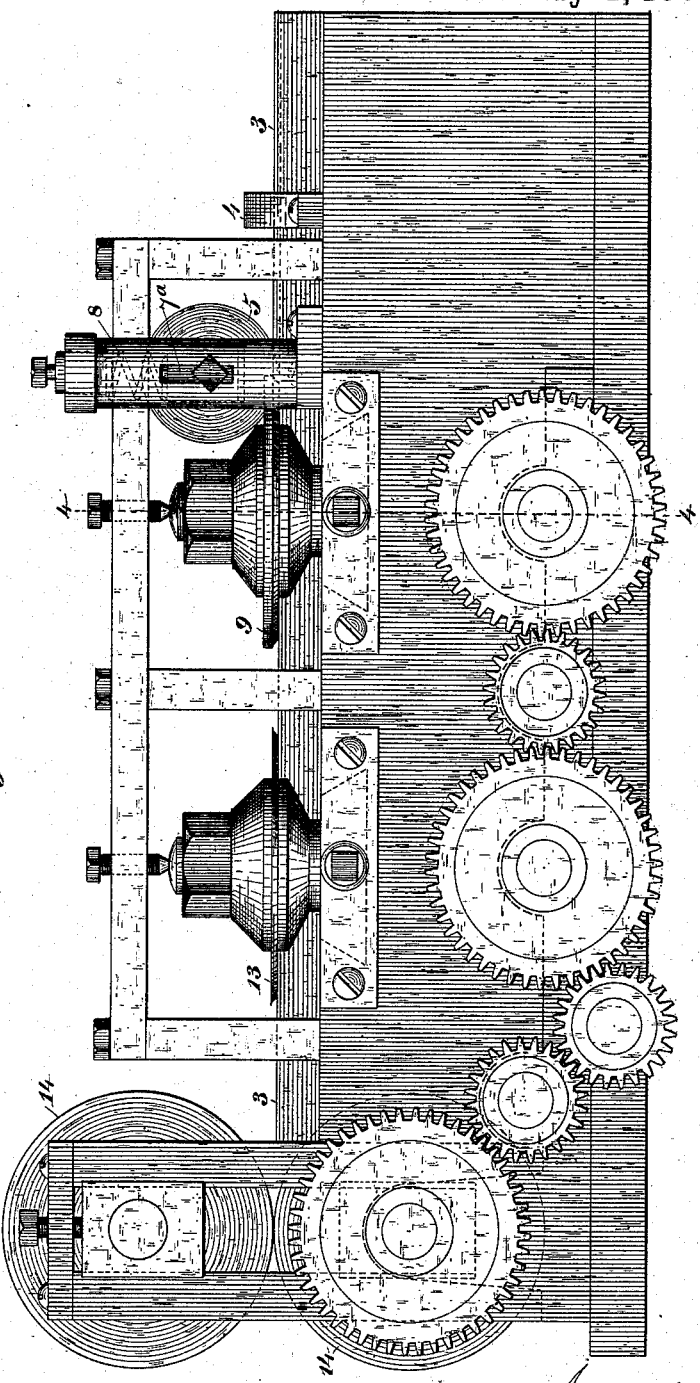

(No Model.) 5 Sheets—Sheet 3.
J. J. C. SMITH.
MACHINE FOR COVERING WIRE FOR ELECTRICAL PURPOSES.
No. 276,724. Patented May 1, 1883.
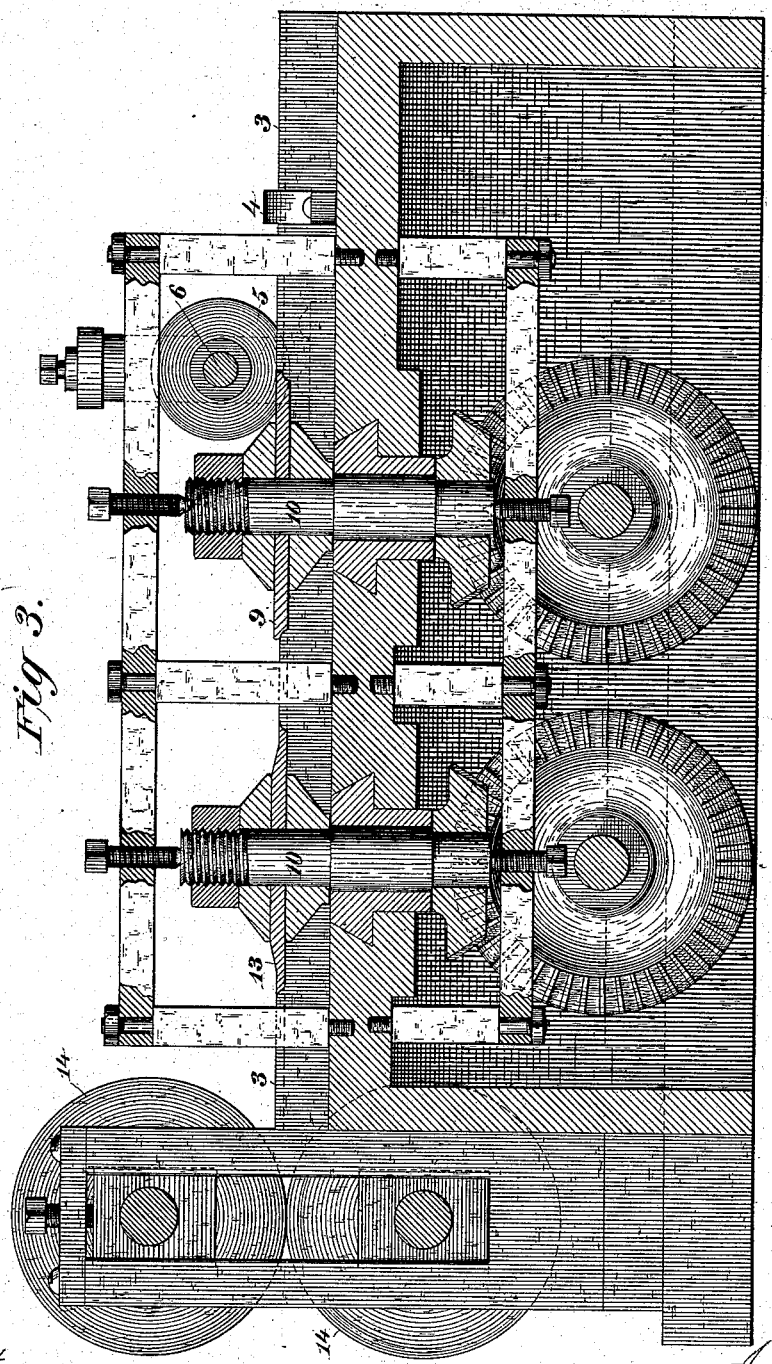

(No Model.)  J. J. C. SMITH.  5 Sheets—Sheet 4.
MACHINE FOR COVERING WIRE FOR ELECTRICAL PURPOSES.
No. 276,724.  Patented May 1, 1883.
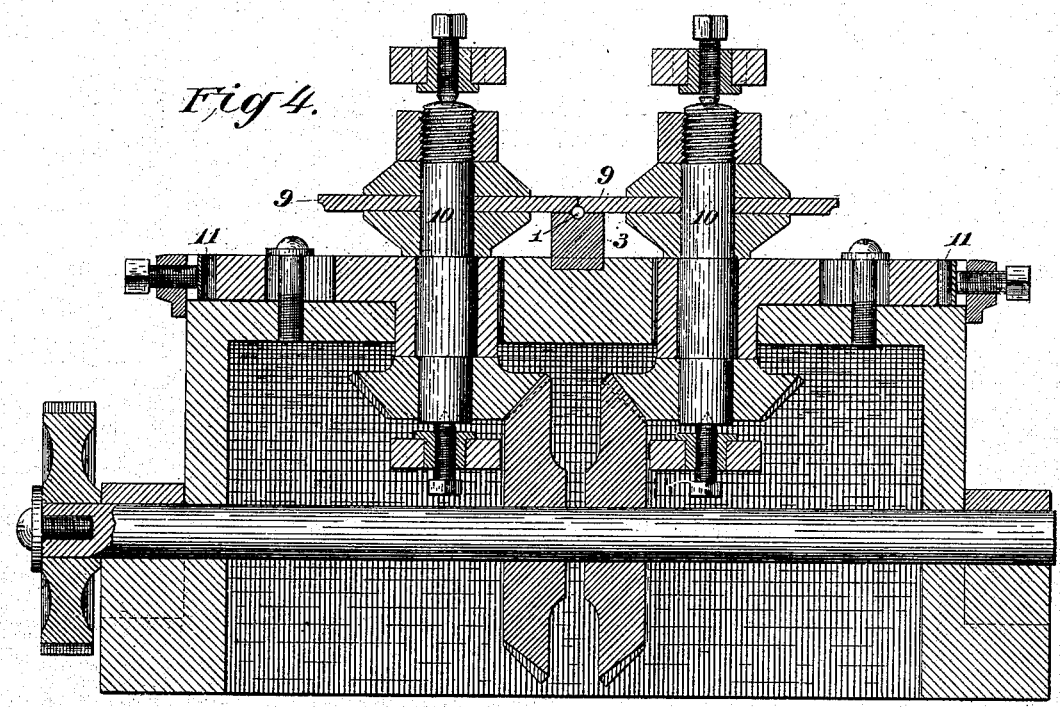
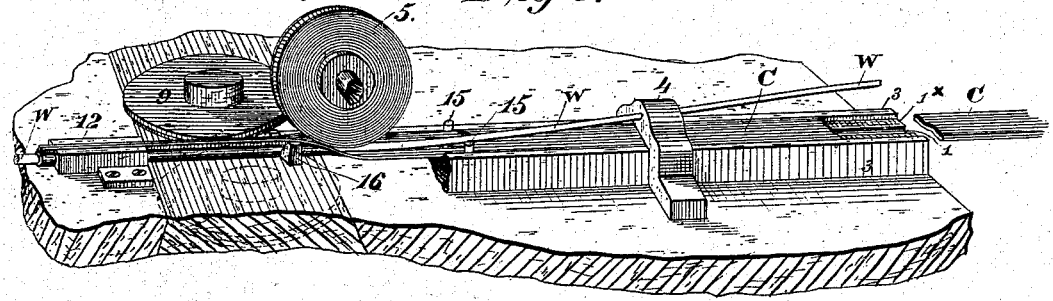

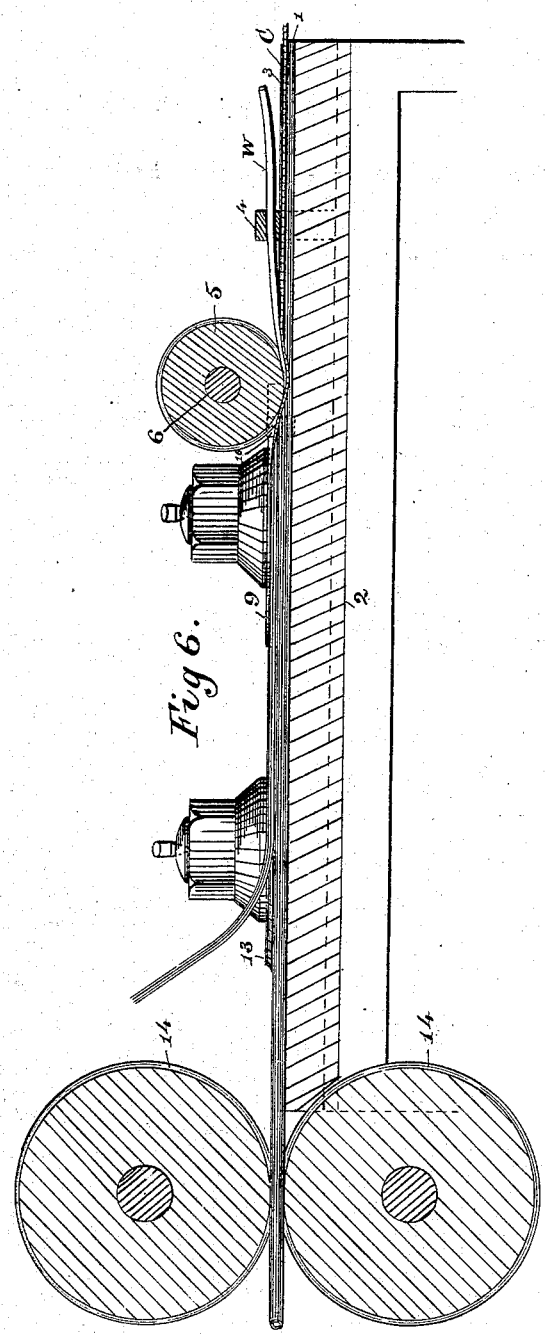

UNITED STATES PATENT OFFICE.

JOHN J. C. SMITH, OF COLLEGE POINT, NEW YORK.

MACHINE FOR COVERING WIRE FOR ELECTRICAL PURPOSES.

SPECIFICATION forming part of Letters Patent No. 276,724, dated May 1, 1883.

Application filed September 20, 1882. (No model.) Patented in England October 7, 1882, No. 4,768; in France October 7, 1882; in Belgium October 7, 1882; in Germany October 18, 1882, and in Spain November 10, 1882.

*To all whom it may concern:*

Be it known that I, JOHN JOSEPH CHARLES SMITH, a citizen of the United States, residing at College Point, in the county of Queens and State of New York, have invented certain new and useful Improvements in Machinery for Covering Wire for Electrical Purposes, of which the following is a specification.

The subject of my invention is a machine for covering wire with insulating material by embedding the wire in a strip of the covering material, drawing the said material tightly around the wire, pressing it together, so as to cause its faces to cohere, and then severing the projecting edge. My machine is provided with suitable guides for feeding the wire and covering material, a grooved wheel for embedding the wire in said covering material, means for turning the covering material up around the wire, a pair of grooved rolls for drawing it tightly around and pressing the meeting faces together, cutters for severing the projecting edge, and drawing-rolls operating on the covered wire to assist the feed.

In order that the invention may be fully understood, I will proceed to describe it with reference to the accompanying drawings, in which—

Figure 1 is a plan view of the apparatus. Fig. 2 is a side elevation thereof. Fig. 3 is a vertical longitudinal section of the same on the line 3 3, Fig. 1. Fig. 4 is a transverse section thereof on the line 4 4, Figs. 1 and 2. Fig. 5 is a perspective view, illustrating the mode of applying the covering material and showing some details of the apparatus. Fig. 6 is a vertical longitudinal section of the machine on the line of the wire, also showing the mode of applying the strip.

A suitable frame-work supports a bed or table, 2, in the center of which is a horizontal guide bar, 3, formed with a semicircular groove, 1. This groove forms the bottom of a longitudinal depression, $1^x$, in the bed or table, of sufficient width and depth to receive, support, and guide the covering-strip over the groove. The covering-strip is formed of plastic rubber composition, or other suitable vulcanizable material, laid on a backing of woven fabric with pressure, which may be applied by means of calender-rolls, so that the backing becomes embedded in and incorporated with the plastic composition, as I have more fully described in another application for Letters Patent for my improved process of covering wire.

Across the guide-bar 3 is a wire-guide, 4, with a suitable opening to feed the wire centrally to the covering-strip as they are together passed through the machine, and in advance of this is a grooved wheel, 5, set directly over the semicircular groove in the guide-bar 3, and mounted on a shaft, 6, which turns on pivots 7, mounted in boxes $7^a$, held down by springs 8, so that the grooved wheel bears on the wire with a yielding pressure.

In advance of the vertical wheel 5 are a pair of horizontal narrow rollers or wheels, 9, mounted on vertical shafts 10 and pressed together by strong springs 11, which are adapted to yield in the event of any foreign matter or undue thickness of material entering between the rollers, but in the ordinary operation of the machine will draw the envelope tightly around the wire and compress the projecting edges of the covering material together, face to face, with considerable force, as hereinafter described. The lower faces or corners of the horizontal rolls or wheels 9 are provided with quarter-circular grooves, forming together a semicircle and form, with the semicircular groove in the guide-bar 3, a circular opening corresponding in size with the thickness of the wire including the covering, so as to fit tightly over the upper half of the wire and covering and draw and press the covering firmly around the wire. In advance of the horizontal pressing or closing rolls 9 is a guide, 12, slotted to permit the passage of the projecting edge or flange of the wire-covering, and in advance of this are a pair of rotary horizontal cutters, 13, by which the said projecting edge is removed, so as to leave a smooth and even surface. The covered wire passes between a pair of rubber rolls, 14, which serve to draw it through the machine and assist the feed.

Between the wire-guide 4 and the grooved pressure-wheel 5 are a pair of studs, 15, serving to turn up the edges of the covering-strip, so that they are readily brought into vertical position by a second pair of guides, 16, between the vertical pressure-wheel 5 and horizontal pressure-rolls 9.

The operation of the apparatus is illustrated in Fig. 5. The copper wire to be covered is fire-tinned or drawn through a suitable bath of soft solder, which may be made of one part of lead and one part of tin. This tinning of the wire is for the purpose of preventing the sulphur in the rubber compound from acting on the copper. A suitable strip, C, of covering material, prepared as described in my other application hereinbefore referred to, is applied in the depression $1^x$ of the grooved guide-bar 3, passed under the wire-guide 4 and beneath the grooved pressure-wheel 5, the edges of the strip being turned upward by the studs or guides 15 16 around the wire W, which is introduced through the opening in the wire-guide 4 and passed beneath the grooved wheel 5. The latter applies sufficient pressure to the wire to embed it in the rubber composition or other plastic material, which bends and yields to the shape of the semicircular groove $1'$ in the guide-bar 3 underneath, thereby partly turning up the edges of the strip. The sides or edges of the covering-strip turned up, as described, pass in vertical position between the horizontal pressure rolls or wheels 9, the quarter-circular grooves in the lower corners of which adapt them to tightly embrace the covered wire, drawing the covering material tightly around the wire, completely pressing out all air and by their vertical faces pressing between them the projecting edges of the covering-strip face to face, effectually incorporate the meeting surfaces of the plastic composition, so as to form a jointless envelope of rubber or other plastic material around the wire from which air is completely expelled.

It is preferred to adapt the horizontal rolls 9 to act with sufficient pressure to partially or completely force out the plastic composition from between the surfaces of the cloth at the point where this pressure is exerted, bringing the cloth itself into close contact, so that when the projecting flange formed by the united edges of the covering-strip is removed by the rotary cutters 13 the wire will be left with a jointless covering of the rubber or other plastic material, and an external envelope of fibrous material firmly incorporated therewith, and having a smooth and uniform exterior surface. This fibrous envelope adapts the wire to be handled in any manner directly it leaves the machine, and it may without detriment be coiled up for placing in the vulcanizer. The cloth backing possesses the necessary tenacity and strength to give a firm hold to the pressure-rolls 9 in drawing the covering tightly around the wire, and to both these and the traction-rolls 14 in drawing the wire through the machine.

Should a wire be desired which shall have an additional metal covering over the gum and fibrous covering, my machine is very well adapted to lay such a metal covering on the insulated wire. When the rubber-covered wire is vulcanized it is passed again through my machine; but instead of using a strip of cloth combined with plastic material, I use a strip of lead or tin of such a thickness as is desired for the metal covering, and of such width as to envelop the insulated wire, leaving a surplus to form a flange for the closing or pressure rolls 9 to act on, as in the application of the strip of insulating and fibrous covering-strip already described. If the pressure-rolls 9 are set to press the metal covering very tightly, the edges of the metal will unite by the pressure, the projecting flange being severed and trimmed off by the rotary cutters, thus laying a thin but firm and smooth metal covering on the wire. If the machine shall be used for applying such an additional covering, the grooves in the guide-bar 3, guide-wheel 5, and pressure rolls or wheels 9 must of course be made larger, and the rotary cutters must be correspondingly elevated to allow for the increased size of the covered wire.

Having thus described my invention, the following is what I claim as new therein and desire to secure by Letters Patent:

1. In a machine for covering wire, the combination of the guide-bar having a depression for the strip, and a groove beneath the depression to receive the strip and wire when the latter are depressed, a suitable guide for the wire, and a wire-depressing device, as set forth.

2. The combination, with a guide-bar having a depression for the strip, and a groove beneath the depression, of a wire-guide, 4, and a means for depressing the wire, as set forth.

3. The grooved wheel 5, for embedding the wire in the strip, in combination with a table having a groove, and a depression above said groove for guiding the strip, and a wire-guide, as set forth.

4. The combination of the grooved guide-bar 3 and the grooved wheel 5 for pressing the wire into the covering material within the groove of guide-bar 3, substantially as described.

5. The combination of guide-bar 3, having depression $1^x$ for the strip and groove $1'$ beneath the depression, a wire-guide, 4, over said guide-bar, and a grooved wheel, 5, for embedding the wire in the strip and forcing it, with the strip, into the groove, as set forth.

6. The combination of a table having a semicircular groove for supporting the strip and embedded wire, and a pair of horizontal closing pressure-rolls, 9 9, having quarter-circular grooves in the lower parts of their peripheries to draw the covering-strip around the wire and press the vertical faces of the strip together, as set forth.

7. The combination of the grooved wheel 5, a suitable guide-bar, and the pressure or closing rolls 9, substantially as and for the purposes set forth.

8. The combination, with the guide-bar 3 and grooved wheel 5, of the pair of closing pressure-rolls 9, grooved on the lower parts of their peripheries to adapt them to draw and compress the covering tightly round the wire, as explained.

9. The combination of the slotted guide 12, a suitable guide-bar, strip-closing pressure-rolls, and rotary cutters 13, substantially as and for the purposes set forth.

10. The combination, with the grooved wheel 5 and guide-bar 3, of the studs or guides 15, to elevate the edges of the covering material while the wire is embedded therein, as described.

11. The combination, with the guide-bar 3, grooved wheel 5, and closing pressure-rolls 9, of the two pairs of studs or guides 15 16, for elevating the sides of the covering-strip to vertical or parallel position in preparation for passing between said closing pressure-rolls, as explained.

12. The combination of a table having groove for the covering-strip, closing rolls, slotted guide-bar for supporting the flange of the covering, rotary cutters for removing the flange, and drawing-rolls, as set forth.

J. J. C. SMITH.

Witnesses:
JUL. Z. WIRLEIN,
THOMAS I. BLAIN.